(12) United States Patent
Bryant et al.

(10) Patent No.: US 9,371,777 B2
(45) Date of Patent: Jun. 21, 2016

(54) FILTER ASSEMBLY INCLUDING PLEAT TIP SHAPES

(75) Inventors: Paul Sherwood Bryant, Amesbury (GB); Hongyi Zhou, Niskayuna, NY (US)

(73) Assignee: BHA Altair, LLC, Franklin, TN (US)

( * ) Notice: Subject to any disclaimer, the term of this patent is extended or adjusted under 35 U.S.C. 154(b) by 1159 days.

(21) Appl. No.: 13/355,631

(22) Filed: Jan. 23, 2012

(65) Prior Publication Data
US 2013/0189081 A1 Jul. 25, 2013

(51) Int. Cl.
*B01D 46/52* (2006.01)
*F02C 7/055* (2006.01)

(52) U.S. Cl.
CPC .............. *F02C 7/055* (2013.01); *B01D 46/522* (2013.01); *B01D 2279/60* (2013.01)

(58) Field of Classification Search
CPC .... B01D 46/52; B01D 46/521; B01D 46/522; B01D 46/523; B01D 27/04; B01D 27/06; B01D 29/0011; B01D 29/036; B01D 29/038; B01D 29/072
See application file for complete search history.

(56) References Cited

U.S. PATENT DOCUMENTS

| | | | |
|---|---|---|---|
| 5,897,776 A | 4/1999 | Mallabone | |
| 7,931,723 B2 | 4/2011 | Cuvelier | |
| 7,997,425 B2 | 8/2011 | Golden et al. | |
| 2005/0045553 A1 | 3/2005 | Muzik et al. | |
| 2009/0020472 A1* | 1/2009 | Lucas | B01D 29/21 210/458 |
| 2009/0272028 A1* | 11/2009 | Drozd et al. | 44/569 |
| 2011/0186504 A1* | 8/2011 | Rocklitz | 210/493.1 |

FOREIGN PATENT DOCUMENTS

| | | |
|---|---|---|
| CN | 1094328 A | 11/1994 |
| EP | 1089802 B1 | 5/2006 |
| JP | 2009297666 A | 12/2009 |
| WO | 2010146462 A2 | 12/2010 |
| WO | WO 2011/017352 A2 | 2/2011 |

\* cited by examiner

*Primary Examiner* — Nathaniel Wiehe
*Assistant Examiner* — Jeffrey A Brownson
(74) *Attorney, Agent, or Firm* — Reinhart Boerner Van Deuren P.C.

(57) ABSTRACT

Solutions for efficiently filtering air for a machine are disclosed. In one embodiment, a filter element for a filter assembly of a rotary machine is provided. The filter element includes: a first set of pleats, each pleat including a first tip radius and a first spacing; and a second set of pleats, each pleat including a second tip radius and a second spacing, wherein the first and second set of pleats are positioned upon a continuous filter media.

14 Claims, 5 Drawing Sheets

FILTER ASSEMBLY INCLUDING PLEAT TIP SHAPES

BACKGROUND OF THE INVENTION

The subject matter disclosed herein relates to filters and, more particularly, to filter assemblies in a rotary machine.

Certain types of machines require a clean airflow in order to operate properly and efficiently. One example of this type of machine is a gas turbine. During operation of a gas turbine, a compressor draws in air from the surrounding environment, compresses the air, and provides it to a combustion chamber. In the combustion chamber, the air is mixed with a supplied fuel that is ignited. This creates high temperature combustion gases that drive the gas turbine.

In order to maintain and/or increase the efficiency of the rotary machine, the air from the surrounding environment must be filtered to remove unwanted particles so that clean, filtered air is provided to the remaining portions of the gas turbine system. The air flows through the filter elements such that the unwanted particles are removed from the air. The media within the filter elements may be pleated to increase the filter surface area, without substantially increasing the overall size and weight of the filter elements.

BRIEF DESCRIPTION OF THE INVENTION

Solutions for efficiently filtering air for a machine are disclosed. In one embodiment, a filter element for a filter assembly of a rotary machine is provided. The filter element includes: a first set of pleats, each pleat including a first tip radius and a first spacing; and a second set of pleats, each pleat including a second tip radius and a second spacing, wherein the first and second set of pleats are positioned upon a continuous filter media.

A first aspect of the disclosure provides a filter element for a filter assembly of a rotary machine, the filter element comprising: a first set of pleats, each pleat including a first tip radius and a first spacing; and a second set of pleats, each pleat including a second tip radius and a second spacing, wherein the first and second set of pleats are positioned upon a continuous filter media.

A second aspect provides a system comprising: a gas turbine; and a filter assembly operably connected to the gas turbine, the filter assembly comprising: a first set of pleats, each pleat including a first tip radius and a first spacing; and a second set of pleats, each pleat including a second tip radius and a second spacing, wherein the first and second set of pleats are positioned upon a continuous filter media.

A third aspect provides a system comprising: a gas turbine; a heat exchanger operably connected to the gas turbine; a steam turbine operably connected to the heat exchanger; and a filter assembly operably connected to the gas turbine, the filter assembly comprising: a first set of pleats, each pleat including a first tip radius and a first spacing; and a second set of pleats, each pleat including a second tip radius and a second spacing, wherein the first and second set of pleats are positioned upon a continuous filter media.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
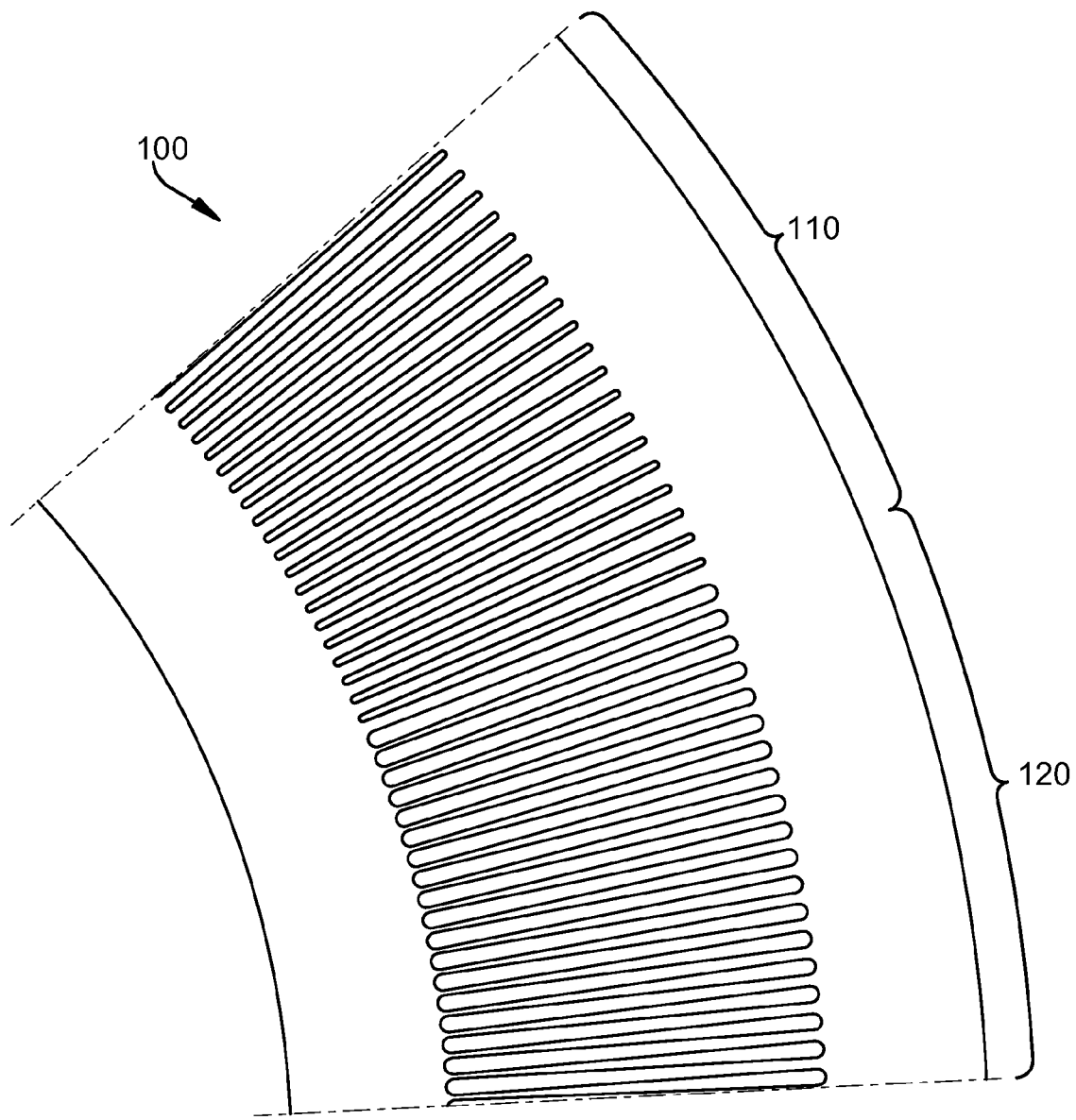
FIG. 1 shows a partial perspective view of a filter element according to embodiments of the invention.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, aspects of the invention provide for systems and devices configured to efficiently filter air in a rotary machine by providing a filter assembly including a plurality of sets of pleats. Each pleat may further include a first set of pleat tips and a second set of pleat tips.

In the art of power generation systems, certain types of machines require a clean airflow in order to operate properly and efficiently. One example of this type of machine is a gas turbine. During operation of a gas turbine, a compressor draws in air from the surrounding environment, compresses the air, and provides it to a combustion chamber. In the combustion chamber, the air is mixed with a supplied fuel that is ignited. This creates high temperature combustion gases that drive the gas turbine.

In order to maintain and/or increase the efficiency, the air from the surrounding environment must be filtered to remove unwanted particles so that clean, filtered air is provided to the remaining portions of the gas turbine system. The air flows through the filter elements such that the unwanted particles are removed from the air. The media of the filter elements may be pleated to increase the filter surface area, without substantially increasing the overall size and weight of the filter elements.

Conventional filter elements include a continuous pleat shape and height. A sharp pleat tip (i.e., a small pleat tip radius) will provide more open surface area to collected unwanted particles. However, the structure of the filter element may be weakened by the sharp pleat tip. A more rounded pleat tip (i.e., a large pleat tip radius) will provide better performance in other environments, but there is less apparent surface area to collected unwanted particles.

Turning to the figures, embodiments of a filter element for a filter assembly are shown, where the varying shapes of the pleats may increase the efficiency of a rotary machine, a turbine, and/or an overall power generation system. Specifically, referring to FIG. 1, a partial perspective view of a filter element 100 is shown according to embodiments of the invention. The filter element 100 may include a first set of pleats 110 and a second set of pleats 120. The first set of pleats 110 and the second set of pleats 120 are positioned upon a substantially continuous filter media body. It is understood that a substantially continuous body is one in which a plurality of elements are configured to form an assembly which would be recognized as a single unit, e.g., a component with a uniform surface or shape but for a set of clearances/gaps between elements.

In the first set of pleats 110, each pleat includes a first tip radius and a first spacing between each pleat. In the second set of pleats 120, each pleat includes a second tip radius and a second spacing between each pleat. It is understood that the first tip radius is substantially different from the second tip radius. For example, as shown in FIG. 1, the first tip radius is less than the second tip radius. Further, it is understood that the first spacing may be substantially different from the second spacing. For example, as shown in FIG. 1, the first spacing is larger than the second spacing. Alternatively, it is understood that the first set of pleats 110 and the second set of pleats 120 may include the same notional spacing. The tip radius of the pleats in both the first set of pleats 110 and the second set of pleats 120 may be approximately 2 millimeters to approximately 0.5 millimeter. The spacing between each pleat in the first set of pleats 110 and the second set of pleats 120 may be approximately 20 millimeters to 1 millimeter.

As clearly seen in FIG. 1, however, the pleat height for each pleat in the first set of pleats 110 and the pleat height for each pleat in the second set of pleats 120 is substantially equal on the filter media body.

By sharpening the pleat tips (i.e., a smaller tip radius), and having a larger spacing between the pleats, the allowable space for the airflow through the filter element 100 is increased. This lowers the overall resistance to airflow, and the final pressure drop across the filter. By lowering the final pressure drop across the filter, the filter may have performance benefits in certain environments; such as a higher dust holding capacity (DHC). However, by rounding the pleat tips (i.e., a larger tip radius), and having a smaller spacing between the pleats, a larger mechanical resistance is created, which acts as a benefit in other types of environment conditions. By including a plurality of sets of pleats 110, 120 in the filter element 100, the design of the filter element 100 is optimized for a wider range of operational environments.

Figure 2:
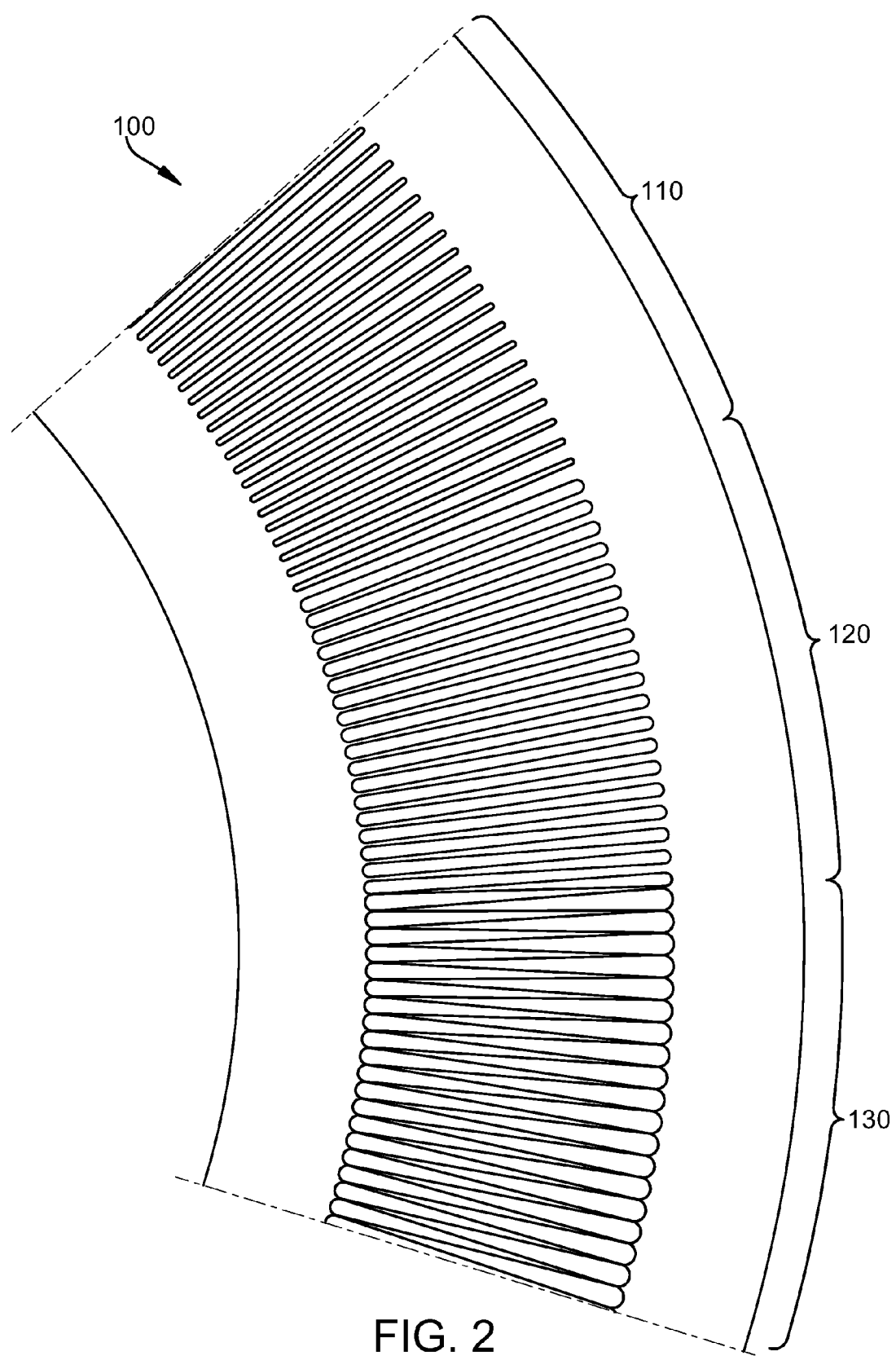
FIG. 2 shows a partial perspective view of a filter element according to embodiments of the invention.

Turning now to FIG. 2, a partial perspective view of a filter element 200 according to embodiments of the invention is shown. The filter element 200 shown includes the first set of pleats 110 and second set of pleats 120 of filter element 100 shown in FIG. 1. However, the filter element 200 also includes a third set of pleats 130. Each pleat in the third set of pleats 130, similar to each pleat in the first set and second set of pleats 110, 120, include a third tip radius and potentially a third spacing. The third tip radius is substantially different from the first tip radius of the first set of pleats 110 and from the second tip radius of the second set of pleats 120. For example, the third tip radius may be less than the second tip radius, and the second tip radius may be less than the first tip radius. Further, the third spacing of the third set of pleats 130 may be substantially different from the first spacing of the first set of pleats 110 and from the second spacing of the second set of pleats 120. For example, second spacing may be larger than the third spacing, and the first spacing may be larger than the second spacing. However, it is understood that any order of sizing for the first, second, and third tip radiuses and the first, second, and third spacings may be possible. Further, it is understood that filter element 100, 200 may include any number of sets of pleats.

Although the embodiments of filter element 100, 200 shown in FIGS. 1 and 2 are shown to include a first sets of pleats 110 and a second set of pleats 120 (and also a third set of pleats 130 (FIG. 2)), where each pleat in the sets of pleats 110, 120, 130 are grouped together, it is understood that filter element 100, 200 may include alternating pleat tips. For example, a pleat of the first set of pleats 110 may be followed by a pleat of the second set of pleats 120, and this pattern may continue for the entire circumference of the filter element 100, 200.

Filter element 100, 200 may be made from any now known or later developed filter material. For example, filter element 100, 200 may be made from cellulose, blends of cellulose and polyester, glass microfiber, blends of glass microfibers and synthetic fibers, and composites. However, it is understood than any filter material may be used.

Figure 3:
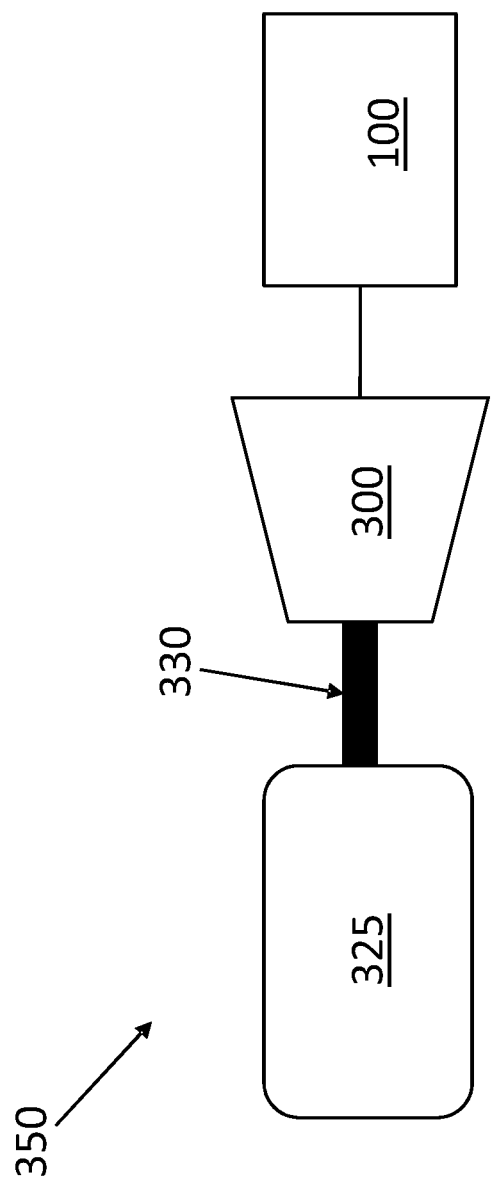
FIG. 3 shows a schematic view of a system according to an embodiment of the invention.

Turning now to FIG. 3, a schematic view of a system 350 according to an embodiment of the invention is shown. System 350 may include a gas turbine 300. However, as mentioned above, the embodiments of the invention may be applied to any machine that benefits from improved air quality. For example, the embodiments of the invention may be similarly applied to different machines such as, but not limited to, gas, steam, or wind turbines, or internal combustion engines. System 350 may also include filter element 100 (or filter element 200, as discussed herein) that is operably connected to gas turbine 300. Gas turbine 300 may be operably connected to a first load device 325. Load device 325 may include, for example, a conventional electric generator, a compressor, a pump, or any other conventional load device. Load device 325 and gas turbine 300 may be mechanically coupled by a shaft 330, which may transfer energy between a drive shaft (not shown) of gas turbine 300 and load device 325.

Figure 4:
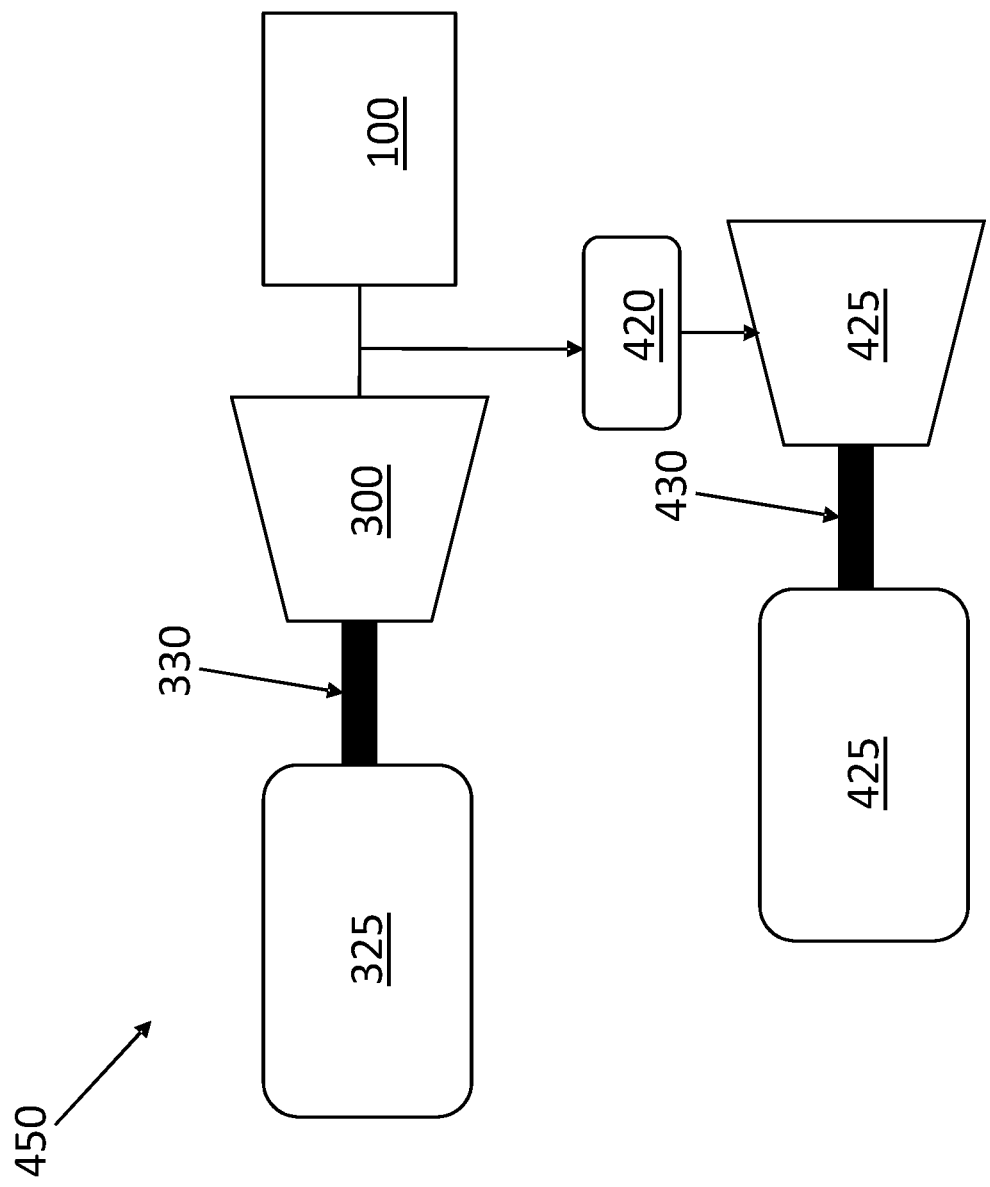
FIG. 4 shows a schematic view of a combined-cycle system according to an embodiment of the invention.
Figure 5:
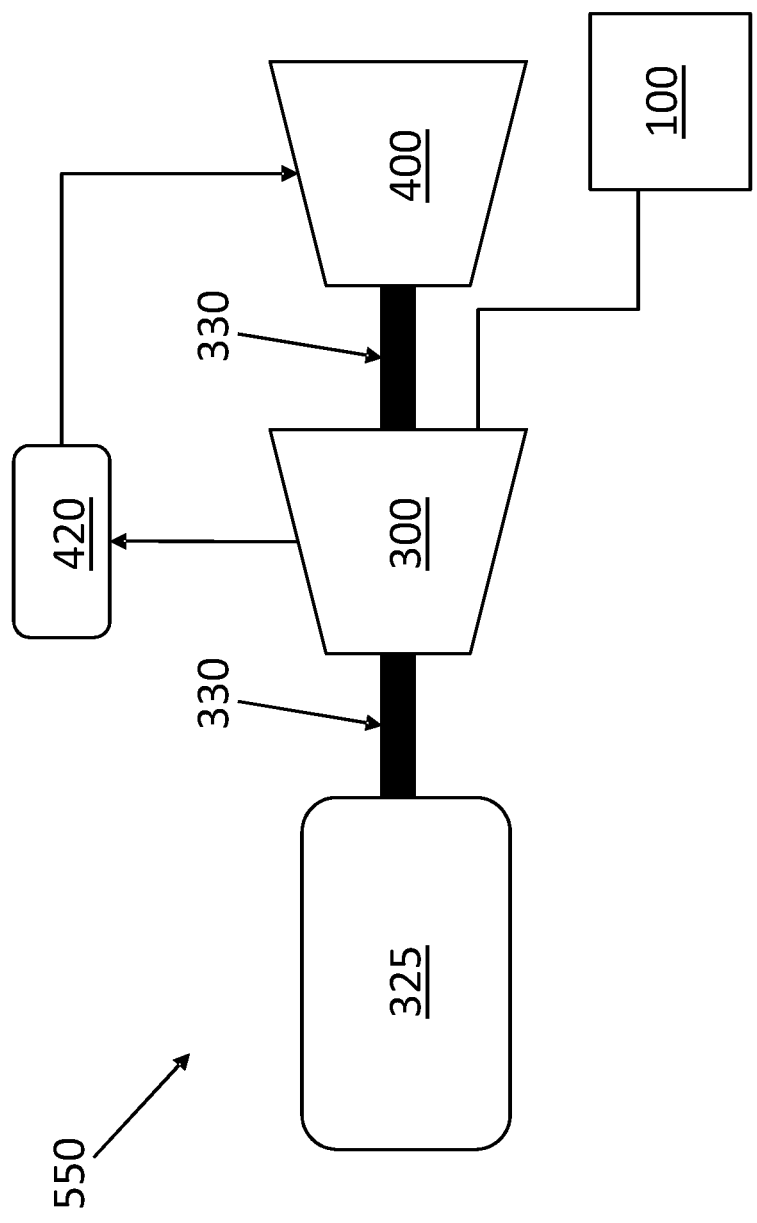
FIG. 5 shows a schematic view of a combined-cycle system according to an embodiment of the invention.

Turning to FIG. 4, a schematic view of portions of a multi-shaft combined cycle power plant 450 is shown. Combined cycle power plant 450 may include, for example, gas turbine 300 operably connected to first load device 325. Also shown in FIG. 4 is a heat exchanger 420 operably connected to gas turbine 300 and a steam turbine 400. System 450 may include filter element 100 (or filter element 200, as discussed herein). Heat exchanger 420 may be fluidly connected to both gas turbine 300 and steam turbine 400 via conventional conduits (numbering omitted). Heat exchanger 420 may be a conventional heat recovery steam generator (HRSG), such as those used in conventional combined cycle power systems. As is known in the art of power generation, HRSG may use hot exhaust from gas turbine 300, combined with a water supply, to create steam which is fed to steam turbine 400. Steam turbine 400 may optionally be coupled to a second load device 425 (via a second shaft 430). Second load device 425 and second shaft 430 may operate substantially similarly to load device 325 and shaft 330 described above. In another embodiment, shown in FIG. 5, a single shaft combined cycle power plant 550 may include a single generator 325 coupled to both gas turbine 300 and steam turbine 400 via a single shaft 330.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A filter element for a filter assembly of a rotary machine, the filter element comprising:
   a first set of pleats, each pleat including a first tip radius and a first spacing, wherein the first tip radius and the first spacing are at a circumference of the filter element; and a second set of pleats, each pleat including a second tip radius and a second spacing wherein the second tip radius and the second spacing are at the circumference of the filter element, wherein the first and second set of pleats are positioned upon a continuous filter media, wherein the first tip radius is less than the second tip radius, and wherein the first spacing is larger than the second spacing.

2. The filter element of claim 1, wherein a pleat height for each pleat of the first set of pleats and a pleat height for each pleat of the second set of pleats is substantially equal.

3. The filter element of claim 1, further comprising a third set of pleats, each pleat including a third tip radius and a third spacing.

4. The filter element of claim 3, wherein the third tip radius is larger than the second tip radius.

5. The filter element of claim 4, wherein the second spacing is larger than the third spacing.

6. A system comprising:
a gas turbine; and
a filter assembly operably connected to the gas turbine, the filter assembly comprising:
  a first set of pleats, each pleat including a first tip radius and a first spacing, wherein the first tip radius and the first spacing are at a circumference of the filter assembly; and
  a second set of pleats, each pleat including a second tip radius and a second spacing wherein the second tip radius and the second spacing are at the circumference of the filter assembly,
  wherein the first and second set of pleats are positioned upon a continuous filter media, wherein the first tip radius is less than the second tip radius, and wherein the first spacing; is larger than the second spacing.

7. The system of claim 6, wherein a pleat height for each pleat of the first set of pleats and a pleat height for each pleat of the second set of pleats is substantially equal.

8. The system of claim 6, further comprising a third set of pleats, each pleat including a third tip radius and a third spacing.

9. The system of claim 8, wherein the third tip radius is larger than the second tip radius.

10. The system of claim 9, wherein the second spacing is larger than the third spacing.

11. A system comprising:
a gas turbine;
a heat exchanger operably connected to the gas turbine;
a steam turbine operably connected to the heat exchanger; and
a filter assembly operably connected to the gas turbine, the filter assembly comprising:
  a first set of pleats, each pleat including a first tip radius and a first spacing, wherein the first tip radius and the first spacing are at a circumference of the filter assembly; and
  a second set of pleats, each pleat including a second tip radius and a second spacing, wherein the second tip radius and the second spacing are at the circumference of the filter assembly,
  wherein the first and second set of pleats are positioned upon a continuous filter media, wherein the first tip radius is less than the second tip radius, and wherein the first spacing is larger than the second spacing.

12. The system of claim 11, wherein a pleat height for each pleat of the first set of pleats and a pleat height for each pleat of the second set of pleats is substantially equal.

13. The system of claim 11, further comprising a third set of pleats, each pleat including a third tip radius and a third spacing.

14. The system of claim 13, wherein the third tip radius is larger than the second tip radius, and wherein the second spacing is larger than the third spacing.

* * * * *